(12) United States Patent
Smith

(10) Patent No.: US 6,293,172 B1
(45) Date of Patent: Sep. 25, 2001

(54) TELESCOPIC POCKET DOOR ANGLE DRILL

(76) Inventor: James C. Smith, 8922 Cypress Ave., Cotati, CA (US) 94931

( * ) Notice: Subject to any disclaimer, the term of this patent is extended or adjusted under 35 U.S.C. 154(b) by 0 days.

(21) Appl. No.: 09/569,094

(22) Filed: May 10, 2000

(51) Int. Cl.[7] .................................................. B25B 17/00
(52) U.S. Cl. ........................ 81/57.13; 81/57.29; 81/177.2
(58) Field of Search ................................ 81/57.13, 177.2, 81/57.29, 57.42, 57.45

(56) References Cited

U.S. PATENT DOCUMENTS

| | | | |
|---|---|---|---|
| 1,395,887 | * 11/1921 | Ayotte | 81/57.45 |
| 4,299,021 | * 11/1981 | Williams | 29/432 |
| 4,474,089 | * 10/1984 | Scott | 81/57.29 |
| 4,703,677 | * 11/1987 | Rossini | 81/471 |
| 4,913,007 | * 4/1990 | Reynolds | 81/57.29 |
| 4,970,918 | * 11/1990 | Brewer et al. | 81/57.29 |
| 5,168,780 | * 12/1992 | Van Gennep | 81/57.29 |
| 5,363,727 | * 11/1994 | Barth et al. | 81/177.2 |
| 5,709,136 | * 1/1998 | Frenkel | 81/57.13 |
| 5,720,542 | * 2/1998 | Birge, Jr. et al. | 362/120 |
| 5,797,300 | * 8/1998 | Fairbanks | 81/60 |
| 6,055,887 | * 5/2000 | Galat | 81/57.13 |
| 6,089,133 | * 7/2000 | Liao | 81/438 |

* cited by examiner

Primary Examiner—James G. Smith
Assistant Examiner—Hadi Shakeri
(74) Attorney, Agent, or Firm—Johnson & Stainbrook, LLP; Larry P. Johnson; Craig M. Stainbrook

(57) ABSTRACT

A pocket door angle drill having a right angle driver with a truly telescopic handle portion that may be extended to reach into confined spaces. The right angle driver has a casing and an internal gear assembly for translating rotary motion from a horizontal drive shaft to a vertical drive shaft. The drill further includes a telescopically extendable primary drive shaft portion that may be operatively connected to a power rotary device, and, optionally, an extension pole having an extension drive shaft for providing access to remote confined spaces.

11 Claims, 3 Drawing Sheets

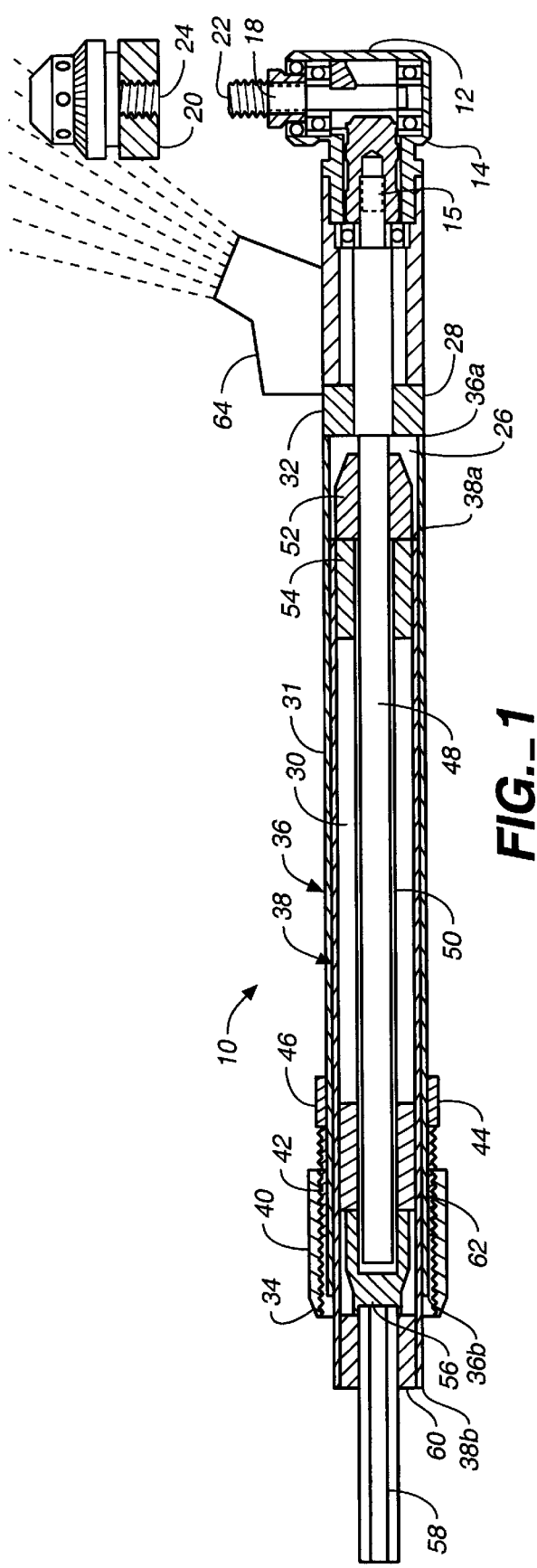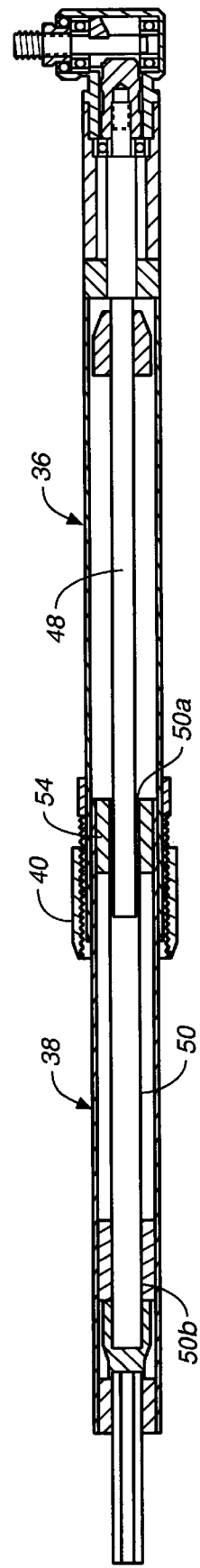

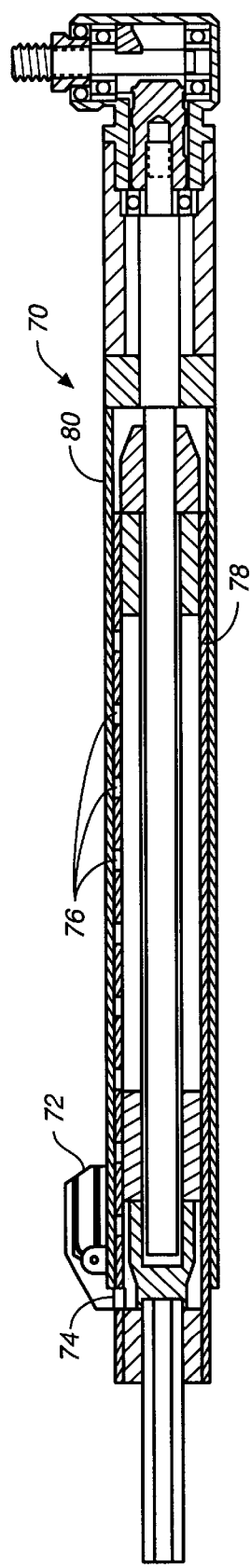
FIG._3
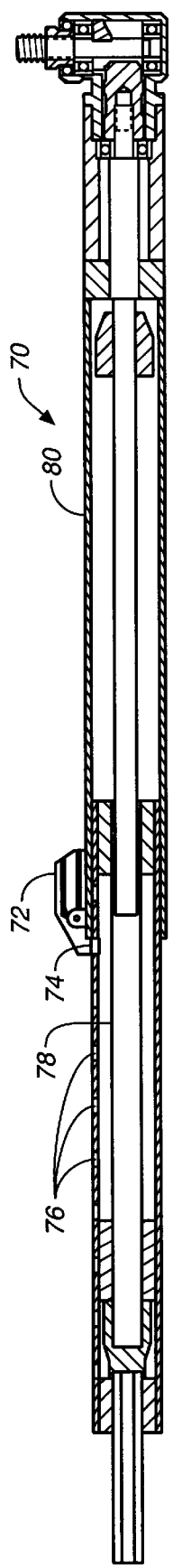
FIG._4

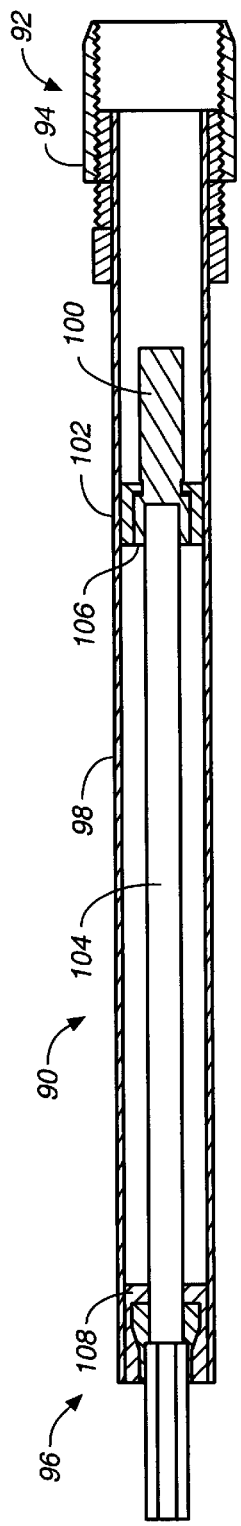
FIG._5
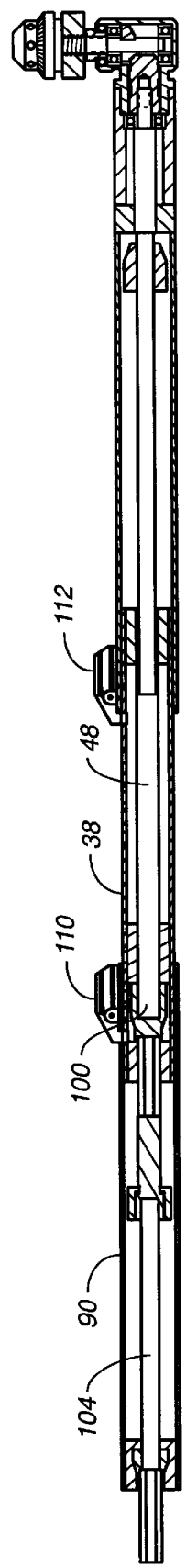
FIG._6

TELESCOPIC POCKET DOOR ANGLE DRILL

BACKGROUND OF THE INVENTION

1. Cross Reference to Related Applications

Not applicable.

2. Field of the Invention

The present invention relates generally to hand tools for working in confined spaces, and more particularly to a telescopically extendable angle drill adapted for use in removing and installing pocket door track hardware.

3. Discussion of Related Art

Pocket doors are notorious for jumping off their roller tracks. Use of the door after it is off the track can result in damage to the track and to the rollers mounted on the door. When this happens, it is typically necessary to remove the door from its pocket by tearing out a substantial portion of the wall defining the door pocket. Because of the inconvenience and expense of such a repair, it would be desirable to have a power tool capable of removing the fastening screws in damaged pocket door hardware and installing fastening screws for replacement hardware without the need to do any structural tear out. More specifically, it would be desirable to provide an angled power drill having a readily adjustable, extendable handle so that pocket door screws both close to and far from the door opening can easily be removed with a minimum of adjustment.

There have been a number of hand tools proposed for angled work and for work in confined spaces generally. For example, U.S. Pat. No. 4,474,089 to Scott teaches a driver for socket wrenches or similar tools constructed to effect rotation of the wrench by rotary wrist action. Manual rotation of a grip is transmitted through shafts and gears to the tool lug and a ratchet mechanism is provided to permit the selective transmission of torque to the tool in either direction of grip rotation. This tool, while suitable for applying rotary power at right angles to the workpiece or fastening devices, is not suitable for work in confined spaces.

U.S. Pat. No. 4,970,918 to Brewer discloses an apparatus and method for manipulating a fastening device such as a bolt or screw is disclosed. The apparatus comprises a handle which has a rotatable shaft inserted through the handle. A housing pivots about one end of the handle. A drive head is located in the housing and has an end which can be adopted to a socket or other device to fit the fastening device. The drive head pivots with the housing as the housing rotates about the handle. The longitudinal axis of the drive head can be aligned with the drive shaft, or the housing and drive head can be pivoted about the handle until the longitudinal axis of the drive head is perpendicular to the drive shaft, and a drive gear mechanically connects the drive shaft to the drive head. The drive shaft can be rotated to manipulate a fastening device at angles of 0 degrees, 90 degrees, and 270 degrees from the drive shaft. This tool provides considerable flexibility in positioning the tool handle relative to the tool head, but it is ill-suited for work in deeply confined spaces requiring an extended handle portion.

U.S. Pat. No. 5,168,780 to Van Gennep discloses a tool driver with a detachable handle for loosening and tightening fasteners or drilling holes in hard-to-reach locations. The tool driver contains a drive shaft and a mechanical means for converting force applied to the drive shaft to motion of a transverse tool attachment. A second tool attachment is located at one end of the drive shaft permitting a tool to be directly driven. A detachable handle is provided for stabilizing and controlling the tool driver. Additionally, the detachable handle is a container for a power source used to power a luminous element which illuminates the workpiece. Again, while this device provides a convenient means to connect a detachable handle at 90 degrees relative to a drill or screwdriver, it does not include any means to extend the handle for reaching into distant spaces.

U.S. Pat. No. 5,709,136 to Frenkel teaches a power driven socket wrench for rotating nuts and bolts in confined spaces. The apparatus includes a head formed of a rotatable socket for engaging nuts and bolts, a bearing for the rotatable socket and a housing around the socket and bearing, and a drive adapter between the head and a power drive for driving the socket. The adapter has an outer elongate housing containing an elongate drive shaft mounted axially therein on suitable bearings and is detachable from the head and the power drive for replacement by an adapter of a different length to enable reaching a nut or bolt at a more remote distance. The adapter housing and shaft are positioned for rotation of the shaft on an axis extending perpendicular to the rotational axis of the socket on the head. The adapter has a detachable locking means such as a snap lock at its inner end for detachably locking the adapter onto the housing of the head. The outer end of the adapter drive shaft has a detachable locking member for detachably engaging the driver member of a power drive or motor. The adapter is neither extendable in itself, nor may it be extended by the connection of second adapter to the first adapter.

U.S. Pat. No. 5,720,542 to Birge, Jr., et al, teaches a hand tool system having a longitudinally extendable operating component (handle) and a longitudinally extendable support component for reaching a remote and/or confined location. The operating component includes a worm drive having a proximal end for attachment to a rotational drive device such as a drill motor, and a distal end for attachment to a rotational driver having a first end which can accept a connector engagement device such as a screwdriver head or other type bit and a second end from which extends a pivotable arm. The support component has a pivotable distal end with a securement member releasably securable to a structure, a hand engageable proximal end, and an exterior surface slidingly engageable with the pivotal arm extending from the driver. In use, an operator manipulates the support component with one hand while powering the drill motor with the other hand such that the support component engages the pivotable arm of the driver to thereby leverage and stabilize the driver during rotational movement of the screwdriver or other bit head and consequent placement of a screw member.

While the device disclosed in the '542 patent has many of the desired features for work in pocket door openings, its extendable operating component is not truly telescopic and has a single, fixed operating position when extended. To date there is as yet no known device that provides truly telescopic extension the drive shaft of an angle drill suitable for use in removing and installing pocket door hardware. Accordingly, it is an object of the present invention to provide an angle drill having a fully telescopic drive shaft to enable power drilling of holes and placement and removal of fastening devices in remote, confined spaces, most particularly a pocket door opening.

SUMMARY OF THE INVENTION

The present invention overcomes the limitations of the related art and provides a general solution to the problem of installing and removing pocket door hardware. Most importantly, the present invention provides a pocket door angle drill having a telescopically extendable handle so that pocket door track screws can easily be installed and removed.

The pocket door angle drill of the present invention comprises a right angle driver having a truly telescopic handle portion that may be extended to reach into confined spaces. The telescopic pocket door angle drill comprises driver having a casing and an internal gear assembly for translating rotary motion from a horizontal drive shaft to a vertical drive shaft, each at substantially right angles to the other, as is well known in the art. The vertical drive shaft may be connected at its end to a drill chuck. The horizontal drive shaft, preferably hexagonal in cross section, extends beyond the end of the casing, where it is journaled by a bushing or bearings.

An extendable drive member is coupled at its proximal end to the driver casing. The extendable drive member includes a drive shaft housing having a hollow exterior shell, and an internal sleeve member slidably inserted into the shell. The sleeve also defines a hollow interior portion. The exterior shell includes locking means at its distal end, preferably comprising a locking collar, which secures the internal sleeve member into a fixed, extended or closed, position.

Running substantially the entire length of the exterior shell is a solid rotatable primary drive shaft which is slidably inserted into a tightly fitting hollow hexagonal tube. At its proximal end, the primary drive shaft is connected to the angle drill's horizontal drive shaft by a hexagonal socket that rotates freely within the exterior shell. This coupling provides stability for the primary drive shaft at the proximal end of the primary drive shaft housing. At its proximal end, the hollow hexagonal tube is stabilized by a bushing or set of bearings secured within the internal sleeve member. At its distal end it terminates at a second hexagonal socket, which also connects the hexagonal tube to a short segment of solid hexagonal drive shaft constituting a secondary drive shaft. The hexagonal socket is bracketed within the internal sleeve member by two bushings or bearing sets.

The secondary drive shaft may be directly connected at its end to a rotary power device and may be operated in the fully closed position, a configuration suited for working in spaces within short reach. Otherwise, the locking collar may be released and the internal sleeve member pulled into an extended position. The exact length of extension is within the operator's discretion, and a primary advantage of the present invention ig its infinite variability. At full extension of the primary drive shaft only, the total length of the device may be roughly doubled by full extension of the internal sleeve member.

If it is necessary to reach into deeply recessed confined spaces, an extension may be operatively connected to the primary drive shaft housing. The extension comprises a pole having a locking collar for coupling to the internal sleeve member of the primary drive shaft housing, an exterior shell, a short segment of hollow hexagonal tube within the shell journaled by a bushing or bearings and coupled to a solid extension shaft by extension socket. At its distal end the extension shaft is journaled with a second bushing or bearing set and extends beyond the end of the exterior shell for coupling to a powered rotary drive device. Further extensions may be added as needed.

BRIEF DESCRIPTION OF THE DRAWINGS

FIG. 1 is a cross-sectional side elevation view of the first preferred embodiment of the pocket door angle drill of the present invention, showing the telescopic extension pole and primary drive shaft housing in the fully closed configuration;

FIG. 2 is a cross-sectional side elevation view of the apparatus of FIG. 1, showing the telescopic extension pole and primary drive shaft housing in an extended position;

FIG. 3 is a cross-sectional side elevation view of a second preferred embodiment of the pocket door angle drill of the present invention, showing alternative means of connecting and adjusting the extension pole relative to the primary drive shaft housing and further showing the apparatus in the fully closed position;

FIG. 4 is a partial cross-sectional side elevation view of the apparatus of FIG. 3, showing the drive shaft and extension pole in the fully extended position and showing the drill chuck installed on the angled drill head;

FIG. 5 is a cross-sectional side elevation view of a preferred embodiment of the extension pole of the present invention; and FIG. 6 is a side elevation cross-sectional view showing the extension pole of FIG. 5 operatively connected to the partially extended internal sleeve member of the primary drive shaft housing.

DETAILED DESCRIPTION OF A PREFERRED EMBODIMENT

FIG. 1 is a cross-sectional side elevation view of the first preferred embodiment of the telescopic pocket door angle drill 10 of the present invention, showing the device in the nonextended, or closed configuration, and FIG. 2 is a cross-sectional side elevation view of the apparatus of FIG. 1, showing the device in an extended configuration. These views show that in the most general terms the inventive apparatus 10 comprises a conventional right angle driver having a telescopic handle portion that may be extended to reach into confined spaces. More particularly, the telescopic right angle drill comprises a driver 12 suitable for driving and removing screws, said driver having a drive casing 14 and an internal gear assembly for translating rotary motion from a first horizontal drive shaft 16 operating in a first plane to a second vertical drive shaft 18 operating in a second plane substantially 90 degrees relative to said first plane, as is well known in the art. The vertical drive shaft 18 includes means for connecting to a drill chuck 20, said means preferably comprising a threaded male portion 22 of said vertical drive shaft and a threaded female portion 24 of said drill chuck. The horizontal drive shaft 16 is preferably solid steel which is hexagonal in cross section and extends beyond the end 26 of the casing, at which end it is journaled by either a sturdy bushing 28 or a set of bearings. Alternatively, the drive shaft may have any of a number of suitable polygonal shapes in cross section, though hexagonal has been demonstrated to be functionally superior to other shapes and is common in the industry.

Coupled to the driver casing 14 is a telescopically extendable handle portion 30, comprising a primary drive shaft housing 31, preferably cylindrical, said housing having a proximal end 32 and a distal end 34, and including a hollow exterior shell 36 having a proximal end 36a and a distal end 36b, and an internal sleeve member 38 slidably inserted into said shell, said sleeve having a proximal end 38a and a distal end 38b and itself defining a hollow interior portion. The exterior shell 36 may be connected to the driver casing 14 by any of a number of suitable means, but preferably entails inserting the driver casing into the proximal end 36a of the shell 36 and securing it either with a tight friction fit or by means of adhesives or fastening devices, as are well known.

The exterior shell is preferably fabricated from a hard, lightweight polymer or fiberglass, and the internal sleeve member is preferably fabricated from aluminum or a suitably strong and lightweight alloy; it is preferably either circular or hexagonal in cross section. At its distal end 36b, the exterior shell further includes locking means, preferably comprising a locking collar 40 with a main body member 42 having a male threaded portion 44 and an annular female threaded portion 46 which tightens onto said male portion to produce a pressure at the coupling and to secure the internal sleeve member into a fixed position, as is known in the art.

Running substantially the entire length of the exterior shell is a solid rotatable primary drive shaft 48 which is slidably inserted into a tightly fitting hollow polygonal tube 50, preferably hexagonal, which comprises a length slightly greater than that of the primary drive shaft, and any rotation of one causes rotation of the other. At its proximal end, primary drive shaft 48 is operatively connected to the angle drill's horizontal drive shaft 16 by a first hexagonal socket 52 which rotates freely within the exterior shell. This coupling provides stability for the primary drive shaft at the proximal end of the primary drive shaft housing.

At its proximal end 50a, hollow tube 50 is stabilized by a first nylon bushing 54 or set of bearings secured within the internal sleeve member. At its distal end 50b, hollow tube 50 terminates at a second hexagonal socket 56, which also connects said hexagonal tube to a short segment of solid hexagonal drive shaft constituting a secondary drive shaft 58. Second hexagonal socket 56 is bracketed within internal sleeve member by a second and a third nylon bushing or set of bearings, 60 and 62, respectively, which center To enable clear visualization of a workpiece in dark location, the present invention may be equipped with an angled light 64 located near the right angle driver and secured to the exterior shell of the primary drive shaft housing so as to broadcast light onto the work surface.

Secondary drive shaft 58 may be directly, operatively connected to a rotary power device, such as drill, sander, buffer, and the like, and may be operated in the fully closed position. This configuration might be best suited for working in spaces within a short distance of the tool operator. Alternatively, as is shown in FIG. 2, locking collar 40 may be loosened and internal sleeve member 38 may be pulled into an extended position to a length desired by the operator. The length to which the sleeve member may be pulled out is infinite in variety because locking collar 40 does not require any specific feature on the internal sleeve member to provide a secure grip on the internal sleeve member. At full extension, first nylon bushing 54 will be located approximately interiorly to said locking collar. Hollow tube 50 will be pulled to nearly the distal end of the primary drive shaft 48, but with a sufficient overlap to ensure a strong operable connection between the two. Thus, depending on the length of the primary drive shaft housing, the total length of the device may be roughly doubled by full extension of the internal sleeve member.

FIG. 3 is a cross-sectional side elevation view of a second preferred embodiment 70 of the pocket door angle drill of the present invention, showing the device in a fully closed position; and FIG. 4 is a view of the device in a fully extended configuration. These views show a locking mechanism comprising a depressible spring-loaded thumb switch 72 having a releasable pin 74 which mates with any one of a plurality of apertures 76 bored into the internal sleeve member 78. While this structural alternative provides a secure connection of the internal sleeve member 78 with the exterior shell 80, it imposes a practical limitation on the number of positions that may be realized when operating in an extended configuration.

FIG. 5 is a cross-sectional side elevation view of a preferred embodiment of the extension pole of the present invention. As noted, if it is desired to reach into deeply recessed confined spaces, for example the interior reaches of a pocket door opening, it may be necessary to connect an extension to the extendable handle portion of the pocket door angle drill. The extension pole 90 has a proximal end 92 having a locking collar 94 for coupling to the internal sleeve member of said primary drive shaft housing, a distal end 96, and comprises an exterior shell 98, a short segment of hollow hexagonal tube 100 journaled by a nylon bushing or bearing set 102 and coupled to a solid extension drive shaft 104 by extension socket 106. At its distal end the extension drive shaft is journaled with a second nylon bushing or bearing set 108 and extends beyond the end of the exterior shell 98 for coupling to a powered rotary drive device.

FIG. 6 depicts the manner in which the extension pole 90 is connected to primary drive shaft 48. This view shows that inner sleeve member 38 is inserted into the proximal end of the extension pole until primary drive shaft 48 firmly inserts into hollow hexagonal tube segment 100. A depressible spring-loaded locking device 110 on the proximal end of the extension pole locks into an aperture in the sleeve member, as does a locking device 112 on the distal end of the primary drive shaft housing. In consequence, the extension pole 90 and the primary drive shaft housing are held in a fixed relationship to one another, and the extension drive shaft is maintained in an operable relationship to the primary drive shaft 48. It will be appreciated that no loss in structural integrity is suffered by using a locking collar as depicted in FIGS. 1, 2 and 5 rather than a spring-loaded locking device having a pin member to engage apertures the inner sleeve member.

If necessary, yet another extension, essentially identical to the above-described extension as illustrated in FIG. 5 may be connected to the extension pole in the same fashion that the extengion pole is connected to the primary drive shaft, In this manner, the reach of the angled drill is limited only by the strength of the operator and the ability of the extensions to bear the weight of the drill as the extension is lengthened. For most purposes it will suffice for the primary drive shaft housing to be manufactured so that when connected to the right angle driver the longest dimension along the length of the primary drive shaft housing and the driver casing is in an easily managed length of approximately twenty-six inches (26 in.; 66 cm). At this size, the fully extended inner sleeve member makes the device approximately thirty-six inches in length (36 in.; 91.5 cm). The extension pole may be manufactured in any of a number of suitable lengths, but a length of approximately twenty-four inches (24 in.; 61 cm) has proven highly practicable. Thus, as a practical matter, it will usually be necessary to connect only one extension pole to reach the most remote pocket door hardware.

While this invention has been described in connection with preferred embodiments thereof, it is obvious that modifications and changes therein may be made by those skilled in the art to which it pertains without departing from the spirit and scope of the invention. Accordingly, the scope of this invention is to be limited only by the appended claims.

What is claimed as invention is:

1. A telescopic pocket door angle drill, said drill having a closed configuration and an extended configuration, said drill comprising:

a right angle driver adapted for driving and removing screws, said driver having a drive casing, an internal gear assembly for translating rotary motion from a first horizontal drive shaft to a second vertical drive shaft operating in a second plane substantially 90 degrees relative to said first plane; and a telescopically extendable handle portion operatively connected to said right angle driver, said telescopically extendable handle portion having a proximal end and a distal end and comprising:

a primary drive shaft housing operatively coupled to said driver casing, said primary drive shaft housing comprising a hollow exterior shell having a proximal end and a distal end;

an internal sleeve member slidably inserted into said hollow exterior shell, said sleeve member defining a hollow interior portion, wherein said sleeve member may be pulled into an extended position relative to said hollow exterior shell, said internal sleeve member having a proximal end and a distal end;

locking means connected to said distal end of said exterior shell for securing said internal sleeve member into a fixed position;

a hollow polygonal tube running substantially the entire length of said primary drive shaft housing, said hollow polygonal tube having a proximal end and a distal end;

a rotatable polygonal primary drive shaft running slidably inserted into said hollow polygonal tube and running substantially the entire length of said primary drive shaft housing; and coupling means for connecting said rotatable polygonal primary drive shaft at its proximal end to said horizontal drive shaft, said coupling means rotating freely within said exterior shell.

2. The telescopic pocket door angle drill of claim 1 wherein said hollow polygonal tube is hexagonal in cross-section and wherein said rotatable polygonal primary drive shaft is hexagonal in cross section.

3. The telescopic pocket door angle drill of claim 2 wherein said coupling means comprises a first hexagonal socket secured within said proximal end of said internal sleeve member.

4. The telescopic pocket door angle drill of claim 2 further comprising:

first journaling means secured within said distal end of said internal sleeve member;

a first bushing secured within said distal end of said internal sleeve member;

a second hexagonal socket in which said hollow polygonal tube terminates at its distal end;

a segment of solid hexagonal drive shaft constituting a secondary drive shaft, said secondary drive shaft operatively connected to said primary drive shaft by said second hexagonal socket and extending distally from said second hexagonal socket; and second journaling means to bracket and stabilize said second hexagonal socket and to facilitate the rotation of said secondary drive shaft and said hollow hexagonal tube.

5. The telescopic pocket door angle drill of claim 4 wherein said first and second journaling means comprise bushings.

6. The telescopic pocket door angle drill of claim 4 wherein said first and second journaling means comprise bearings.

7. The telescopic pocket door angle drill of claim 2 wherein said locking means comprises a locking collar.

8. The telescopic pocket door angle drill of claim 2 wherein said internal sleeve member includes a plurality of apertures and wherein said locking means comprises a depressible spring-loaded thumb switch having a pin for releasably mating with said apertures.

9. The telescopic pocket door angle drill of claim 1, further comprising an extension pole operatively connected to said extendable handle portion, said extension pole having a proximal end and a distal end, said extension pole comprising:

an exterior shell;

extension pole connection means secured to said exterior shell at said proximal end of said extension pole for coupling to said internal sleeve member of said primary drive shaft housing;

a hexagonal socket positioned near said proximal end of said extension pole;

a segment of hollow hexagonal tube integrally connected to said hexagonal socket and extending proximally along the length of said extension pole from said hexagonal socket;

a solid extension drive shaft integrally connected to said hexagonal socket and extending along the length of said extension pole from said hexagonal socket;

a first bushing journaling said hexagonal socket;

a hexagonal extension socket interposed between and operatively connecting said hollow hexagonal tube and said solid extension drive shaft; and a second bushing journaling one end of said extension drive shaft, said drive shaft extending beyond said distal end of said extension pole for operatively connecting to a powered rotary drive device.

10. The telescopic pocket door angle drill of claim 9 wherein said exterior shell is cylindrical.

11. The telescopic pocket door angle drill of claim 9 wherein said extendable handle portion is cylindrical.

* * * * *